US010511561B2

(12) United States Patent
Tseng et al.

(10) Patent No.: US 10,511,561 B2
(45) Date of Patent: *Dec. 17, 2019

(54) MEDIA PLUG-IN FOR THIRD-PARTY SYSTEM

(71) Applicant: Facebook, Inc., Menlo Park, CA (US)

(72) Inventors: Erick Tseng, San Francisco, CA (US); Yoon Kean Wong, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/453,568

(22) Filed: Mar. 8, 2017

(65) Prior Publication Data

US 2017/0180302 A1 Jun. 22, 2017

Related U.S. Application Data

(63) Continuation of application No. 14/069,768, filed on Nov. 1, 2013, now Pat. No. 9,648,058.

(51) Int. Cl.
*H04L 12/58* (2006.01)
*G06Q 10/10* (2012.01)
(Continued)

(52) U.S. Cl.
CPC ............ *H04L 51/32* (2013.01); *G06Q 10/10* (2013.01); *G06Q 30/02* (2013.01); *H04L 65/403* (2013.01);
(Continued)

(58) Field of Classification Search
CPC ... G06Q 10/10; H04L 29/06; H04L 29/08072; H04L 29/06027; H04L 12/581;
(Continued)

(56) References Cited

U.S. PATENT DOCUMENTS 5,974,371 A * 10/1999 Hirai .................. G06F 17/289
704/2
6,795,892 B1 * 9/2004 Pereira ................. G11C 15/00
365/203
(Continued)

FOREIGN PATENT DOCUMENTS

| JP | 2010527492 A | 8/2010 |
| JP | 2012532370 A | 12/2012 |
| JP | 2013045461 A | 3/2013 |

OTHER PUBLICATIONS

PCT Notification of Transmittal of the International Search Report and the Written Opinion of the International Searching Authority, or the Declaration for International application No. PCT/US2014/062826, dated Jan. 28, 2015.
(Continued)

*Primary Examiner* — Mahran Y Abu Roumi
(74) *Attorney, Agent, or Firm* — Baker Botts L.L.P.

(57) ABSTRACT

In one embodiment, a method includes receiving a request to display a media plug-in on a third-party website hosted by a third-party system, determining media content associated with the request to display the media plug-in, and determining whether the third-party website is being viewed by a user that is currently logged in to the social-networking system. The method further includes determining one or more user-selectable objects based at least on the determined media content and the determination of whether the user is currently logged in to the social-networking system and providing the determined one or more user-selectable objects for display in the media plug-in on the third-party website. The third-party system is separate from the social-networking system. The user-selectable objects, once selected, cause an action related to the determined media content.

16 Claims, 6 Drawing Sheets

(51) Int. Cl.
  *G06Q 30/02* (2012.01)
  *H04L 29/06* (2006.01)
  *H04L 29/08* (2006.01)
  *G06Q 50/00* (2012.01)
(52) U.S. Cl.
  CPC .............. *H04L 67/02* (2013.01); *H04L 67/20*
    (2013.01); *H04L 67/22* (2013.01); *H04L 67/24*
    (2013.01); *G06Q 50/01* (2013.01)
(58) Field of Classification Search
  CPC .. H04L 29/06326; H04L 12/66; H04M 7/006;
    H04N 21/4622; H04N 7/17318; H04N
    5/44543; H04N 21/4782; H04N 21/8586
  USPC ........................................................ 709/204
  See application file for complete search history.

(56) References Cited

U.S. PATENT DOCUMENTS

| | | | | |
|---|---|---|---|---|
| 7,784,026 | B1* | 8/2010 | Wong .................. | G06F 9/454 |
| | | | | 717/109 |
| 8,621,000 | B2* | 12/2013 | Adimatyam ........ | H04L 65/4084 |
| | | | | 709/203 |
| 2004/0183829 | A1* | 9/2004 | Kontny ................. | G06Q 10/10 |
| | | | | 715/758 |
| 2006/0277332 | A1* | 12/2006 | Yamashina ............. | G06F 17/24 |
| | | | | 710/62 |
| 2010/0280860 | A1 | 11/2010 | Iskold et al. | |
| 2011/0019662 | A1* | 1/2011 | Katis .................. | H04L 12/1831 |
| | | | | 370/352 |
| 2012/0020651 | A1* | 1/2012 | Gilson ................... | H04N 5/782 |
| | | | | 386/296 |
| 2012/0303703 | A1 | 11/2012 | Richter et al. | |
| 2013/0268973 | A1* | 10/2013 | Archibong ............. | G06Q 50/01 |
| | | | | 725/51 |
| 2013/0275429 | A1* | 10/2013 | York .................. | G06F 17/30029 |
| | | | | 707/737 |
| 2013/0282806 | A1 | 10/2013 | Steinberg et al. | |
| 2014/0130070 | A1* | 5/2014 | Meare ................ | H04N 21/8456 |
| | | | | 725/9 |
| 2014/0207659 | A1* | 7/2014 | Erez ................... | G06O 30/0633 |
| | | | | 705/39 |
| 2014/0325579 | A1* | 10/2014 | Schuman ........... | H04N 21/2187 |
| | | | | 725/116 |
| 2015/0088622 | A1* | 3/2015 | Ganschow ............. | G06Q 50/01 |
| | | | | 705/14.5 |
| 2015/0304728 | A1* | 10/2015 | Shovkoplias ...... | H04N 5/44543 |
| | | | | 725/53 |
| 2016/0048307 | A1* | 2/2016 | Troyer ................... | G06F 9/454 |
| | | | | 715/801 |

OTHER PUBLICATIONS

Japanese Patent Office Communication regarding Notification of Reason for Rejection, PCT/US2014/062826 with English translation, dated Jun. 20, 2017.

Mie Aoki, "Obtaining useful information through Internet; social media utilization," Nikkei Personal Computing, NIKKEI Business Publications, Inc., vol. 638, pp. 87-90, ISSN 0287-9506. (no translation available), Nov. 28, 2011.

Tomoe Makino, Practical lecture: Utilization of Youtube studied from advanced cases, Nikkei Net Marketing, NIKKEI Business Publications, Inc., vol. 23, pp. 56-57, ISSN 1882-1642. (no translation available), 2009.

* cited by examiner

MEDIA PLUG-IN FOR THIRD-PARTY SYSTEM

RELATED APPLICATIONS

The present application is a continuation of U.S. patent application Ser. No. 14/069,768 filed Nov. 1, 2013, and entitled "Media Plug-In for Third-Party System".

TECHNICAL FIELD

This disclosure generally relates to social networking and more specifically to providing a media plug-in for third-party systems.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments enhance a user's media viewing experience by providing contextual media plug-ins from a social-networking system which may be displayed on a third-party website using, for example, a mobile device, a personal computer, or any other computing system. A media plug-in may include user-selectable objects in a graphical user interface that, when selected, cause specific actions associated with particular media content. For example, if a media plug-in is displayed on a third-party website for a particular TV show, the media plug-in may include user-selectable buttons that cause actions such as, for example, watching a particular episode of the particular TV show. The particular user-selectable objects provided by the social-networking system to be displayed in the media plug-in on the third-party website may be based on whether a user who is viewing the third-party website is currently logged into the social-networking system or if the user has previously provided certain configuration information to the social-networking system.

In certain embodiments, the user-selectable buttons of the media plug-in may include one or more of a watch button, a record button, a remind button, an event button, and a message button. The watch button allows the user to immediately begin viewing media content in, for example, a video player. The video player may include a video player of the social-networking system that is embedded in the third-party website, a video player of the user's browser, a video player on another third-party website, or a native video player of the user's computer system. The record button sends commands to the user's set-top box (STB) or digital video recorder (DVR) to record, for example, a TV show. The remind button sets a reminder or notification for the user for when certain media content (e.g., the next airing of a TV show) is available. The event button creates an event on the social-networking system for certain media content (e.g., the future time and date of the airing of a movie). The message button provides the user with an interface to chat with or message other users of the social-networking system about the media content.

DESCRIPTION OF EXAMPLE EMBODIMENTS

Figure 1:
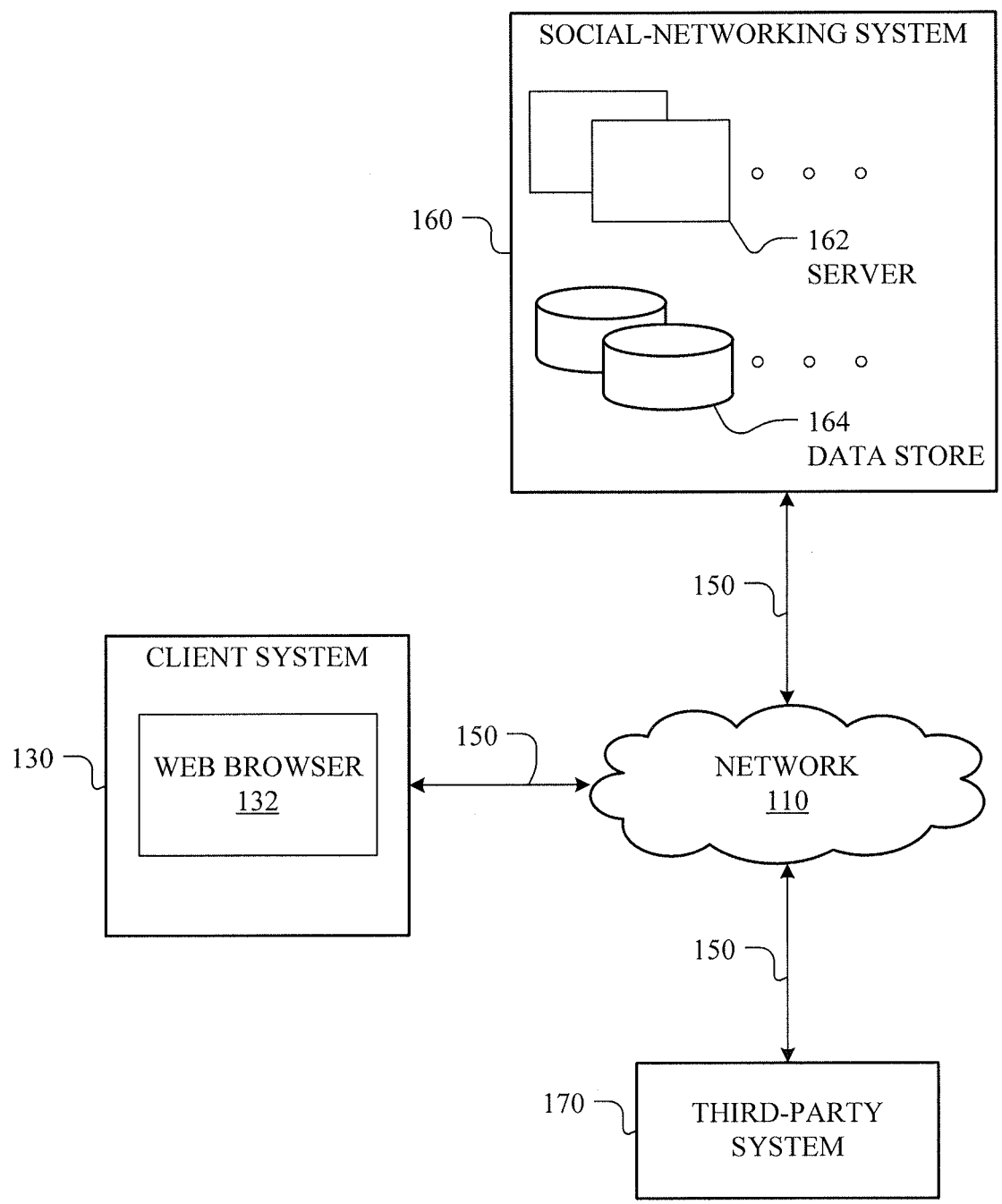
FIG. 1 illustrates an example network environment associated with a social-networking system, according to certain embodiments.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
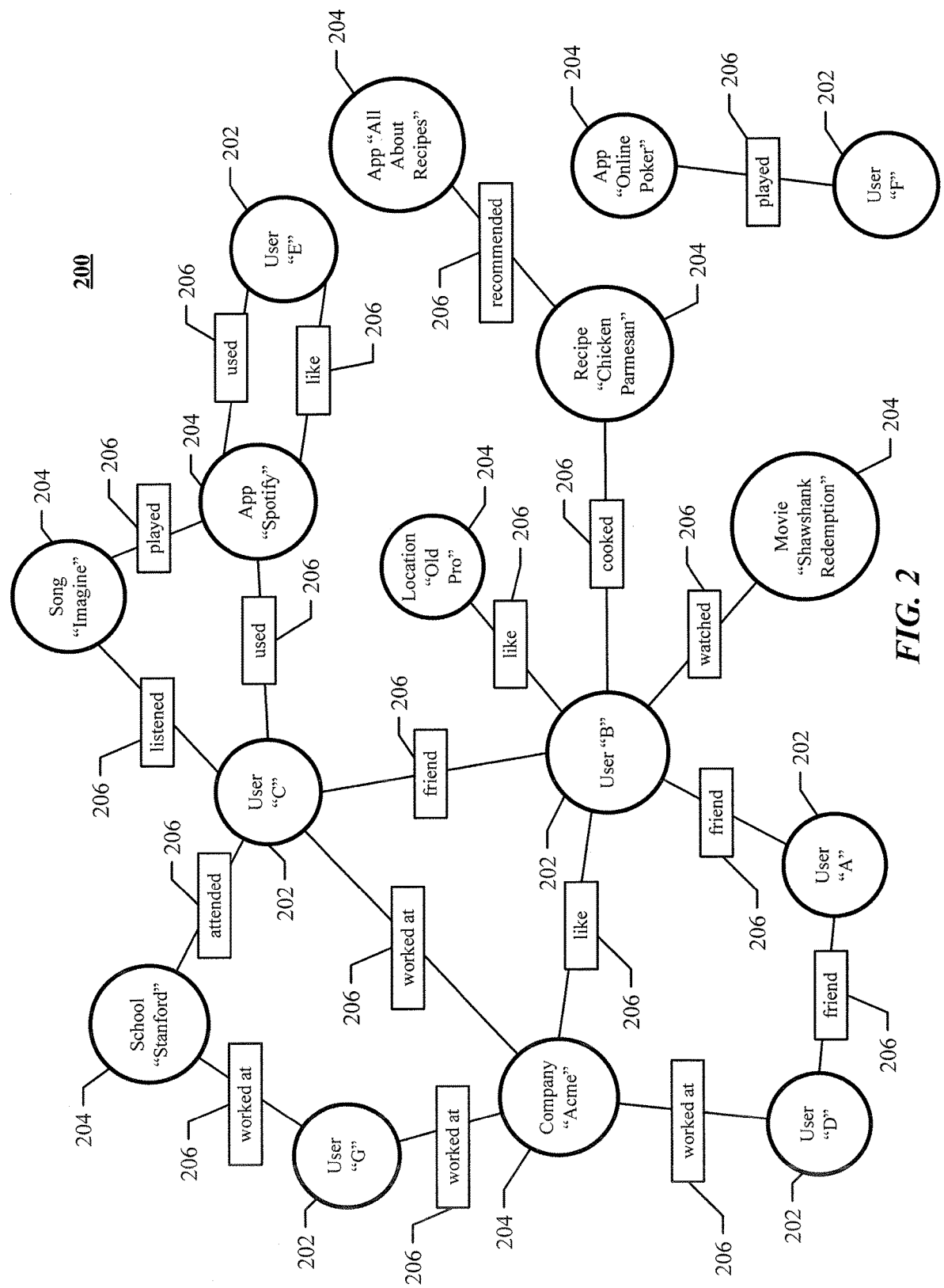
FIG. 2 illustrates an example social graph of a social-networking system, according to certain embodiments.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. As an example and not by way of limitation, an advertisement may display information about a friend of the user within social-networking system 160 who has taken an action associated with the subject matter of the advertisement.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Figure 3:
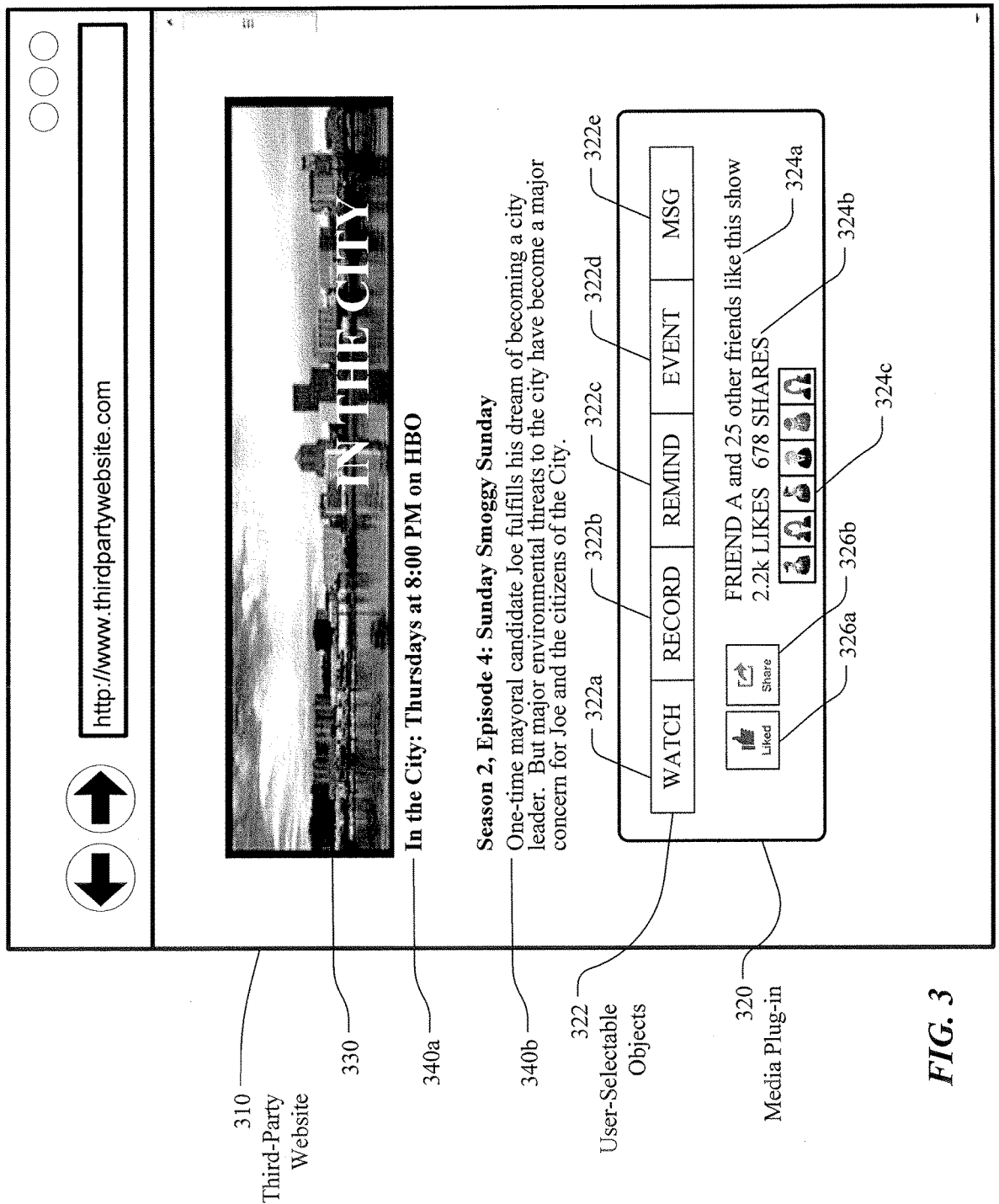
FIG. 3 illustrates an example third-party website with a media plug-in from a social-networking system, according to certain embodiments.

FIG. 3 illustrates an example third-party website 310 with a media plug-in 320 provided by social-networking system 160. Third-party website 310 may be displayed in any browser on any client system 130 such as a mobile device 130, a desktop computer 130, or any other client system 130. Third-party website 310 may be provided by third-party system 170 that is separate from social-networking system 160, as described further below.

In general, media plug-in 320 provides the user of third-party website 310 with one or more user-selectable objects (e.g., user-selectable objects 322 described below) that are related to specific media content of the third-party website 310. For example, if the user is viewing a third-party website 310 for a specific TV show, media plug-in 320 may be displayed on the third-party website 310 for the specific TV show and may provide one or more user-selectable objects (e.g., buttons) to perform an action related to the media content of the specific TV show. As a specific example, if a user is viewing third-party website 310 for the TV series "In the City," media plug-in 320 may include a button to watch a specific episode of "In the City," a button to record a specific episode of "In the City," a button to create an event on social-networking system 160 related to a specific episode of "In the City," and the like.

In some embodiments, the user-selectable objects of media plug-in 320 may be contextually based. For example, the user-selectable objects of media plug-in 320 may be based on whether or not the user is currently logged into social-networking system 160 and/or whether the user has provided certain configuration information to social-networking system 160. For example, if the user who is viewing third-party website 310 for the TV series "In the City" is currently logged into third-party system 170 and has provided social-networking system 160 information about which cable provider the user utilizes, then media plug-in 320 may include user-selectable objects to watch or record a specific episode of "In the City." However, if the user who is viewing third-party website 310 for the TV series "In the City" is not currently logged into third-party system 170 or has not provided social-networking system 160 with the required configuration information, then media plug-in 320 may only include user-selectable objects to, for example, set a reminder for the TV series "In the City." Various embodiments of user-selectable objects 322 of media plug-in 320 are discussed in more detail below.

Third-party website 310 may be any website that is provided by any third-party (e.g., NBC.com, IMdB.com, etc.). In particular embodiments, a user using client system 130 may connect to and communicate with third-party website 310 through network 110. Third-party website 310 may be served by, for example, a web server of third-party system 170 that may be communicatively connected to one or more data stores of third-party system 170 that store user data and web page information. User data may include, for example, user name, user profile picture, and user profile information (e.g., location, affiliation, interest). Web page information may include, for example, page layout information, scripts, web page content such as text (e.g., ASCII or HTML), media data (e.g., graphics, photos, video clips), and executable code objects (e.g., a game executable within a browser window or frame). In particular embodiments, a user may use a web browser or special-purpose client application hosted on client system 130 to access third-party website 310 by sending an HTTP request to the web server of third-party system 170, causing the web server to access the one or more data stores and construct one or more web pages or frames displayed in the web browser or the special-purpose client application.

Social-networking system 160 may communicate and access third-party website 310, and vise versa, through network 110. For example, a third-party website 310 constructed by third-party system 170 for a user of social-networking system 160 can contain information from social-networking system 160, such as a frame displaying profile pictures of the user's friends who are currently active on third-party website 310. For example, a user's user profile page of social-networking system 160 can contain an embedded video clip that the user posted on third-party website 310. In some embodiments, a web page constructed by a first web site may include one or more inline references that cause client system 130 to access and display content from a second website by incorporating in the web page's HTML document URLs and/or script code (e.g., JavaScript, PHP, AJAX) that causes a client application hosted on client system 130 to access the second website to dynamically provide content specified by the script code (e.g., profile pictures). In some embodiments, a browser cookie installed by a second website on client system 130 can be used to facilitate accessing the second website. For example, requests transmitted to social-networking system 160 for a particular user may include a browser cookie or other token to enable automatic authentication and access to social-networking system 160 for the particular user (e.g., to access and display profile pictures of the particular user's friends), without the particular user having to manually enter user ID and password information of the social networking system.

In some embodiments, registered users of social-networking system 160 may provide certain configuration information or settings to social-networking system 160. The configuration information may include any information about the user's over-the-top (OTT) content provider (e.g., NetFlix, Hulu, Amazon Video, YouTube, etc.), the user's multiple system operator (MSO) (e.g., Comcast, Time Warner, AT&T U-verse, Dish Network, etc.), or any other content provider of the user. For example, the configuration information may include an indication of a MSO subscription package for the user (e.g., the user subscribes to the "basic" cable package from Comcast), an indication of a MSO of the user (e.g., the user's cable provider is Time Warner), login information for a set-top box (STB) of the user, login information for a digital video recorder (DVR) of the user, subscription information for the user to a provider of on-demand Internet streaming media (e.g., Netflix, Hulu, etc.), and an indication of a location of the user. This configuration information may be stored and utilized by social-networking system 160 in order to determine, for example, a time and channel in which a user who is viewing third-party website 310 may view a particular TV show of third-party website 310.

Third-party website 310 may be associated with any appropriate media content, including, but not limited to, TV shows, movies, clips, videos, and the like. In the illustrated embodiment of FIG. 3, the media content of third-party website 310 is a TV show titled "In the City," which airs every Thursday at 8:00 PM Pacific time on HBO. Third-party website 310 may include a media content image 330 and media content information 340 for the media content of the third-party website 310. For example, media content information 340 may include airing time 340a for the media content and episode description 340b for a specific episode of the media content of third-party website 310.

Third-party website 310 includes one or more media plug-ins 320. Media plug-in 320 is any appropriate plug-in provided by social-networking system 160 and incorporated into third-party website 310 by the provider of third-party website 310. As used herein, a "plug-in" is any code or script that is provided by social-networking system 160 to developers of third-party website 310 as "drop" in blocks of code or scripts that the developers of third-party website 310 may easily integrate with their websites. The plug-in code or script, when executed by a web browser, causes one or more user-selectable objects 322 to appear on the third-party website 310. In some embodiments, the plug-in code or script may additionally cause social content 324 or social buttons 326 to appear on the third-party website 310. In some embodiments, media plug-in 320 may include one or more URLs that cause one or more actions. For example, media plug-in 320 may include a URL to display a video player such as video player 410 described below.

Media plug-in 320 includes one or more user-selectable objects 322. The particular user-selectable objects 322 that are displayed in media plug-in 320 are determined by social-networking system 160 and may depend on the particular media content of third-party website 310 or whether the user who is viewing third-party website 310 is currently logged in to social-networking system 160, as described below. User-selectable objects 322 may be any appropriate objects that may be displayed on third-party website 310. For example, user-selectable objects 322 may be text, a graphical button, an image, a screen capture, or any other object that may be rendered on third-party website 310. Various example embodiments of user-selectable objects 322 are disclosed below.

In some embodiments, user-selectable objects 322 may include a watch button 322a. Watch button 322a may cause any appropriate action or provide any appropriate commands to immediately begin playing media (e.g., a particular episode) associated with the particular media content (e.g., TV show) of third-party website 310. In some embodiments, watch button 322a, once selected, may send instructions to the user's set-top box (STB) in order to tune to an appropriate channel to being displaying media associated with the particular media content of third-party website 310. As described in more detail below, some embodiments may utilize configuration information provided by the user in order to tune the user's STB to the appropriate channel to begin displaying the appropriate media. In some embodiments, watch button 322a, once selected, may send instructions to begin playing a video associated with the particular media content of third-party website 310 in any appropriate video player. For example, a video of a particular episode of the TV show "In the City" may begin playing in an embedded video player of social-networking system 160 on third-party website 310 once watch button 322a is selected. In other embodiments, other types of video players, as described in detail below in reference to video player 410, may be launched once watch button 322a is selected. In some embodiments, watch button 322c may only be presented on third-party website 310 if the user who is viewing third-party website 310 is currently logged into social-networking system 160 and has provided social-networking system 160 with appropriate configuration information.

In some embodiments, user-selectable objects 322 may include a record button 322b. Record button 322b may cause any appropriate action or provide any appropriate commands to record media (e.g., a particular episode) associated with the particular media content (e.g., TV show) of third-party website 310. In some embodiments, record button 322b, once selected, may send instructions to the user's digital video recorder (DVR) or STB in order set the DVR or STB to record the media associated with the particular media content of third-party website 310. As described in more detail below, some embodiments may utilize configuration information provided by the user in order to provide the appropriate instructions to set the user's DVR or STB to record the appropriate media. In some embodiments, record button 322b may only be presented on third-party website 310 if the user who is viewing third-party website 310 is currently logged into social-networking system 160 and has provided social-networking system 160 with appropriate configuration information.

In some embodiments, user-selectable objects 322 may include a remind button 322c. Remind button 322c may cause different actions depending on whether the user is currently logged into social-networking system 160. For example, if the user is currently logged into social-networking system 160, remind button 322c may cause a reminder to be set within social-networking system 160 to remind the user when media associated with the particular media content of third-party website 310 will be available. As a specific example, if a logged-in user selects remind button 322c on a third-party website 310 for the TV show "In the City," a reminder may be set within social-networking system 160 to remind the user when the next episode of "In the City" will be airing. If, however, a user who is not logged into social-networking system 160 selects remind button 322c, the user may be presented with an option to log into social-networking system 160. Once the user logs into social-networking system 160, a reminder may then be set within social-networking system 160 to remind the user when the next episode of "In the City" will be airing.

In some embodiments, user-selectable objects 322 may include an event button 322d. Event button 322d causes a social event to be created within social-networking system 160. Generally, an event within social-networking system 160 is any social occasion (e.g., birthday party, graduation, etc.) that is planned by a user of social-networking system 160. The user who plans the event may invite other users of social-networking system 160 to attend the event. In the context of social buttons 326, event button 322d, once selected by a logged-in user of social-networking system 160, may present the user with a webpage of social-networking system 160 in which the event may be created. In some embodiments, certain portions of the event may be pre-populated with information related to the particular media content of third-party website 310. For example, if the logged-in user selects event button 322d on third-party website 310 for the TV show "In the City," the user may be presented with a webpage of social-networking system 160 in which an event for "In the City" may be created. Certain portions of the event for "In the City" may be pre-populated with appropriate information for "In the City" (e.g., the time of the event may be set to the next airing time of "In the City," the details of the event may be pre-populated with text such as "Join me to view the next episode of 'In the City,'" etc.). In some embodiments, event button 322*d* may only be presented on third-party website 310 if the user who is viewing third-party website 310 is currently logged into social-networking system 160 and has provided social-networking system 160 with appropriate configuration information.

In some embodiments, user-selectable objects 322 may include a message button 322*e*. Message button 322*e*, once selected, causes a messaging (e.g., chat) interface to be presented to the user. In some embodiments, the messaging interface may be presented directly on third-party website 310 (e.g., an embedded chat interface, a pop-up interface, etc.). In other embodiments, a website of social-networking system 160 may be displayed to the user once message button 322*e* is selected. The website of social-networking system 160 may provide an interface that allows the user to chat with other users of social-networking system 160 about the particular media content of third-party website 310. In some embodiments, portions of the chat interface may be pre-populated with information related to the particular media content of third-party website 310. For example, if the logged-in user selects message button 322*e* on third-party website 310 for the TV show "In the City," the chat interface may be pre-populated with text such as "I am currently watching "In the City." Do you want to chat about it?"

In some embodiments, media plug-in 320 may include social content 324. Social content 324 is any social content associated with the particular media content of third-party website 310 that is determined by social-networking system 160 from social graph 200. In some embodiments, social content 324 may include an indication of how many other users of social-networking system 160 have viewed, "liked," shared, or posted comments about the particular media content of third-party website 310. As a specific example, consider the example third-party web site 310 of FIG. 3 in which the media content is the TV show "In the City." Social-networking system 160 may query social graph 200 and determine that twenty six of the user's friends have "liked" the TV show "In the City." Social content 324*a* of "FRIEND A and 25 other friends like this show" may then be generated and provided for display within media plug-in 320. In another example, social-networking system 160 may query social graph 200 and determine that over 2,200 other users have "liked" "In the City" and that 678 other users have shared "In the City." Social content 324*b* of "2.2 k LIKES 678 SHARES" may then be generated and provided for display within media plug-in 320. In some embodiments, social content 324 may also include a facepile 324*c*. Facepile 324*c* may include, for example, images, icons, or avatars of other users (e.g., friends) of social-networking system 160 who have liked the particular media content of third-party website 310, as determined using social graph 200.

Social buttons 326 are any user-selectable options that permit a user to perform one or more actions associated with the particular media content of third-party website 310. For example, social buttons 326 may include graphical buttons that the user may select to indicate that he "likes" the particular media content of third-party website 310, to comment about particular media content of third-party website 310, and to share the particular media content of third-party website 310. Once selected, user social buttons 326 may cause any appropriate action within social-networking system 160. For example, if a user selects social button 326*a* to "like" the particular media content of third-party website 310 (e.g., "In the City"), an edge 206 may be added to social graph 200 to indicate that the user "likes" "In the City." As another example, if a user selects social buttons 326*b* to "share" "In the City," a post may appear in the user's friends' newsfeed indicating that the user has shared "In the City."

Media content image 330 may be any image or graphic associated with the media content of third-party website 310. In some embodiments, media content image 330 may be an image captured from video associated with the media of third-party website 310. For example, media content image 330 may be an image captured from the TV show "In the City."

Figure 4:
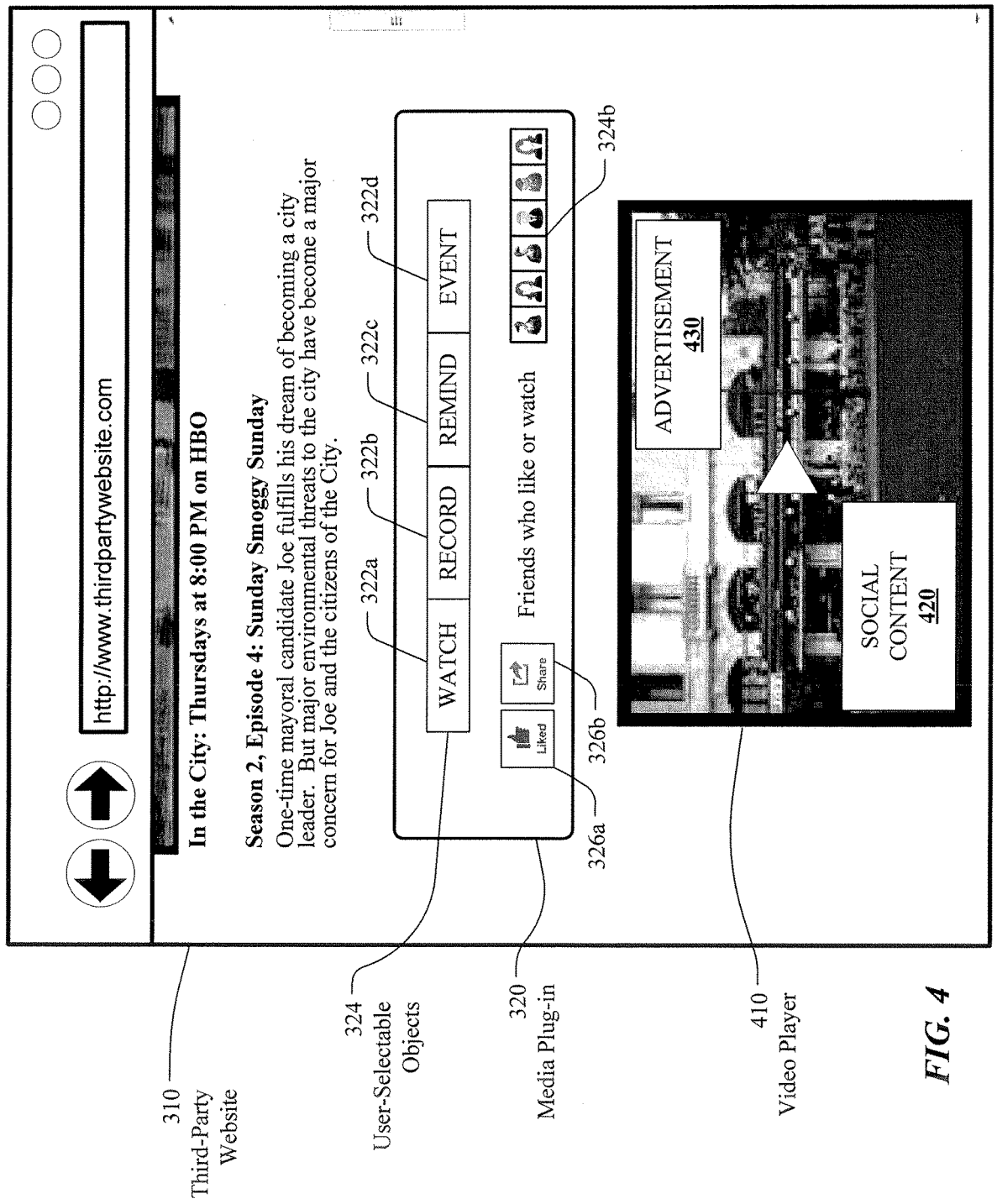
FIG. 4 illustrates an example video player that may be displayed on the third-party website of FIG. 3, according to certain embodiments.

FIG. 4 illustrates an example video player 410 that may be displayed on third-party website 310. In some embodiments, video player 410 may be launched when watch button 322*a* is selected by a user. In some embodiments, watch button 322*a* may include one or more URL in order to launch video player 410. For example, watch button 322*a* may include a first URL of video player 410 (e.g., a URL that points to where video player 410 is located within network 110) and a second URL of the content to be played within video player 410 (e.g., a URL that points to where the video that will be played in video player 410 is located). As described below, video player 410 may be various types of video players as determined by social-networking system 160.

In some embodiments, video player 410 may be a video player of social-networking system 160. For example, social-networking system 160 may develop and host video player 410 on social-networking system 160. In some embodiments, the video player 410 of social-networking system 160 may appear inline (e.g., embedded) within third-party website 310 even though it is hosted by social-networking system 160. Any appropriate technology, such as HTML frame elements (e.g., iframes), may be utilized to embed video player 410 of social-networking system 160 within third-party website 310. In some embodiments, video player 410 of social-networking system 160 may include standardized controls (e.g., pause, play, rewind). In some embodiments, video player 410 of social-networking system 160 may include social content 420 related to the video that is playing within video player 410. For example, social-networking system 160 may determine from social graph 200 one or more other friends of the user who have viewed, liked, shared, are currently watching, etc. the particular video that is currently playing in video player 410. As another example, social-networking system 160 may determine one or more conversations or comments by users of social-networking system 160 about the particular video that is currently playing in video player 410. Social-networking system 160 may then display social content 420 on top of the video playing within video player 410. In some embodiments, social-networking system 160 may determine one or more advertisements 430 related to the particular video that is currently playing in video player 410 and display advertisements 430 on top of the video playing within video player 410. In some embodiments, the social content 420 and advertisements 430 may be time-synced with the video playing within video player 410. For example, if a user of social-networking system 160 previously posted a comment about the video playing within video player 410 at the 25-second mark of the video, the user's comment may appear on top of the video playing within video player 410 at the 25-second mark when another user views the video.

In some embodiments, video player 410 may be a video player of the user's browser. For example, if the user is utilizing a specific browser (e.g., Mozilla Firefox, Google Chrome, Microsoft Internet Explorer, etc.), video player 410 may be a video player developed or otherwise provided by the specific browser. In some embodiments, video player 410 provided by the specific browser may appear inline (e.g., embedded) when a user selects watch button 322*a*.

In some embodiments, video player 410 may be a video player of a content provider. For example, a video player of the producer or provider of "In the City" (e.g., HBO) may appear when a user selects watch button 322*a*. The video player 410 of the content provider may appear, for example, as a pop-up video player on third-party website 310 or as a video player on another webpage that is associated with the content provider (e.g., a redirect to a webpage on HBO.com that includes the video player 410 of HBO). In such embodiments, the video that appears in video player 410 may be hosted by the content provider.

In some embodiments, video player 410 may be a native video player of the user's computer system. For example, if the user has an account with an OTT provider such as Netflix, the user may have a native video player or application from the OTT provider already installed on his computer. In such embodiments, the native video player or application from the OTT may appear when the user selects watch button 322*a*.

In operation, social-networking system 160 provides code to the developer of third-party website 310 for displaying media plug-in 320 on third-party website 310. Media plug-in 320 includes one or more user-selectable objects 322 as determined by social-networking system 160. The one or more user-selectable objects 322 of media plug-in 320 are related to media content (e.g., a TV show, movie, etc.) that is featured, displayed, discussed, etc., on third-party website 310. In some embodiments, media plug-in 320 may also include social content 324 and social buttons 326, as described above.

Once the code for media plug-in 320 has been incorporated into third-party website 310 by the developer of third-party website 310, media plug-in 320 may be rendered on third-party website 310 when a user requests to view third-party website 310 on a browser using any client system 130. In order to display media plug-in 320 on third-party website 310 to a user, social-networking system 160 first receives a request to display media plug-in 320 on third-party website 310. The request may be sent by a browser of the user, third-party system 170, a webserver of third-party system 170, or any other server or computer system. In some embodiments, the request may include a cookie, token, or identifier of the user who is viewing third-party website 310. For example, the identifier may be a username of the user, a user identification number of the user, an IP address of the user, or any other identification of the user who is viewing third-party website 310. In some embodiments, the request may include a content identifier for media content of the third-party website 310 being viewed. For example, the content identifier may be any appropriate number or text to identify a TV show, movie, video, clip, etc. that is featured, discussed, or otherwise presented on third-party website 310. In some embodiments, the content identifier may be a page ID on social-networking system 160 for the media content. For example, if third-party website 310 is a website for the TV show "In the City," the content identifier may be a page ID within social-networking system 160 for "In the City." In some embodiments, the request to display media plug-in 320 may include an identifier of the webpage on which media plug-in 320 will be displayed. For example, the request may include a URL of third-party website 310 on which media plug-in 320 will be displayed.

After receiving the request to display media plug-in 320 on third-party website 310, social-networking system 160 may determine the media content associated with the request to display the media plug-in 320. For example, social-networking system 160 may determine the particular TV show or movie of third-party website 310 on which media plug-in 320 will be displayed. In some embodiments, the media content may be determined from the request to display media plug-in 320. For example, if the request includes a URL of third-party website 310 on which media plug-in 320 will be displayed, social-networking system 160 may utilize the URL to receive and analyze third-party website 310 in order to determine the particular media content of third-party website 310. As a specific example, if a request is received from third-party website 310 for "In the City," social-networking system 160 may utilize the URL to capture a copy of third-party website 310 for "In the City" and then analyze various portions of the webpage (e.g., title, headings, etc.) in order to determine that the media content is for "In the City." As another example, if the request includes a content identifier for "In the City," social-networking system 160 may search social graph 200 for the content identifier in order to determine the particular media content of third-party website 310 is "In the City."

In some embodiments, social-networking system 160 may determine whether third-party website 310 is being viewed by a user that is currently logged in to social-networking system 160. In some embodiments, social-networking system 160 may utilize a cookie, token, or user identifier included in the request to display media plug-in 320 in order to determine whether third-party website 310 is being viewed by a user that is currently logged in to social-networking system 160. For example, if the request to display media plug-in 320 includes a particular username of the user who is viewing third-party website 310, social-networking system 160 may search or otherwise analyze its databases using the provided username to determine if the user is currently logged in to social-networking system 160. As another example, if the request to display media plug-in 320 includes an IP address of the user who is viewing third-party website 310, social-networking system 160 may search or otherwise analyze its databases using the provided IP address to determine if the user is currently logged in to social-networking system 160.

After determining the particular media content of third-party website 310 and determining whether the user who is viewing third-party website 310 is currently logged in to social-networking system 160, social-networking system 160 determines one or more user-selectable objects 322 to display in media plug-in 320 on third-party website 310. The determined one or more user-selectable objects 322 may be based on the determined media content and the determination of whether the user is currently logged in to social-networking system 160. For example, if the determined content is the TV show "In the City" and the user is logged in to social-networking system 160, social-networking system 160 may provide event button 322*d* that allows the user to create an event on social-networking system 160 for viewing the next episode of "In the City." As another example, if the determined content is the TV show "In the City" and the user is logged in to social-networking system 160, social-networking system 160 may provide watch button 322*a* that allows the user to immediately begin watching an episode of "In the City." In some embodiments, the determined one or more user-selectable objects 322 may be additionally based on whether the user has provided configuration information or settings (e.g., cable provider information) to social-networking system 160, as described below. The one or more user-selectable objects 322 may include watch button 322*a*, record button 322*b*, remind button 322*c*, event button 322*d*, and message button 322*e*, as described above.

In some embodiments, if social-networking system 160 determines that the user who is viewing third-party website 310 is currently logged in to social-networking system 160, social-networking system 160 may determine if the user has previously provided configuration information to social-networking system 160. If the user previously provided configuration information to social-networking system 160, social-networking system 160 may utilize the configuration information in order to determine which user-selectable objects 322 to display in media plug-in 320. For example, if the user has provided configuration information that indicates he utilizes Comcast as his cable provider, social-networking system 160 may provide watch button 322*a*. The provided watch button 322*a* may be configured to launch a video player of Comcast to view an episode of "In the City." As another example, if the user has provided configuration information that indicates the user's cable provider and login information for the user's STB or DVR, social-networking system 160 may provide record button 322*b*. The provided record button 322*b* may be configured to send commands or instructions using the configuration information to the user's STB or DVR to record a future episode of "In the City." In this case, the commands would include the appropriate time and channel for "In the City" as provided by the user's cable provider.

In some embodiments, if social-networking system 160 determines that the user who is viewing third-party website 310 is not currently logged in to social-networking system 160 or has not provided configuration information, social-networking system 160 may provide a reduced number of user-selectable objects 322 in media plug-in 320. For example, if social-networking system 160 determines that the user who is viewing third-party website 310 is not currently logged in to social-networking system 160 or has not provided configuration information, social-networking system 160 may only provide remind button 322*c* in media plug-in 320. Selecting the remind button 322*c* may prompt the user to log in to social-networking system 160. If the user has not provided configuration information, or if social-networking system 160 is unable to otherwise determine the user's content provider, remind buttons 322*c* may cause a generic reminder for the media content of third-party website 310 to be set (e.g., "'In the City' airs every Thursday at 8 PM Eastern, 7 PM Central on HBO.") instead of a specific reminder that may include the appropriate time and channel for the user to view "In the City."

In some embodiments, the configuration information provided by the user to social-networking system 160 may include location information for the user. For example, the configuration information may indicate that the user resides in Menlo Park, Calif., USA. Social-networking system 160 may then utilize this location information to determine which user-selectable objects 322 to display in media plug-in 320. For example, if the user resides in a country in which online streaming is not available for particular media content, social-networking system 160 may determine not to provide watch button 322*a* to the user.

As discussed above, some embodiments may provide message button 322*e* that causes a messaging (e.g., chat) interface to be presented to the user. The messaging interface may be presented directly on third-party website 310 (e.g., an embedded chat interface, a pop-up interface, etc.), or on a website of social-networking system 160. The website of social-networking system 160 may provide an interface that allows the user to chat with other users of social-networking system 160 about the particular media content of third-party website 310. In some embodiments, social-networking system 160 may provide additional functionality within the provided chat interface, as discussed below.

In some embodiments, social-networking system 160 may provide a chat interface that displays multiple available chat rooms that the user may join. For example, when the user selects message button 322*e*, an interface may appear that graphically lists different chat rooms related to the user or media content (e.g., TV shows, movies, etc.) relevant to the user. The user may then select one of the chat rooms in which to participate. In some embodiments, each chat room in the provided list may include social content from social graph 200. For example, each chat room may include a graphical representation of how many other users are participating in the chat room. The other users may be connections of the user (e.g., friends) according to social graph 200.

In some embodiments, the graphical list of available chat rooms may be ordered in any appropriate order. In some embodiments, the list of available chat rooms is arranged in order of the number of participants of the chat rooms (e.g., listed from most to fewest participants). In some embodiments, the list of available chat rooms is arranged in order of available media content for the user (e.g., chat rooms for TV shows that the user may view according to the user's cable subscription package are listed first). In some embodiments, the list of available chat rooms is arranged in order of time (e.g., shows that are currently airing are listed first, shows that are almost over are pushed to the bottom, etc.).

In some embodiments, the list of available chat rooms is arranged in order of social coefficients and/or a taste algorithm for the user. Some embodiments may utilize coefficients as described in U.S. patent application Ser. No. 12/978,265 entitled "Contextually Relevant Affinity Prediction in a Social Networking System," which is incorporated herein by reference. Social networking system 160 may utilize the following information from social graph 200 in determining coefficients of specific media content for an individual user:

the number of friends of the user who have liked the specific media content the total number of users of social networking system 160 who have liked the specific media content the number of friends of the user who have viewed the specific media content the total number of users of social networking system 160 who have viewed the specific media content a taste algorithm (e.g., users who liked the specific content will also like this other content.)

Social networking system 160 may then combine the information above in order to determine a coefficient associated with the user for each content. For example, consider a scenario in which a query of social graph 200 for a specific media content yielded the following results:

the number of friends of the user who have liked the specific media content=5 the total number of users of social networking system 160 who have liked the specific media content=1000 the number of friends of the user who have viewed the specific media content=2 the total number of users of social networking system 160 who have viewed the specific media content=250

The combination of these example results would yield a coefficient of 5±1000+2+250=1257 for this specific media content for the user. Social networking system 160 then performs similar calculations in order to determine coefficients of other media content for the user. In certain embodiments, the resulting coefficients of all media content are then ranked for the user. A predetermined number of the top-ranked media content may then be used to rank the available chat room (e.g., chat rooms for the highest rated media content may be listed first).

As discussed above, a taste algorithm may be utilized by social networking system 160 to determine the order of available chat rooms. For example, social networking system 160 may first determine first media content that a user watched, liked, or otherwise interacted with on social networking system 160. In some embodiments, the first media content may be determined using social graph 200. Once the first media content has been determined, social networking system 160 may then search social graph 200 to determine other users or friends of the user who also watched, liked, or otherwise interacted with the first media content on social networking system 160. Social networking system 160 may then search social graph 200 for second media content that the determined users or friends watched, liked, or otherwise interacted with on social networking system 160. In some embodiments, weighting factors may be utilized in determining what media content to recommend to a user. For example, second media content viewed by a user's friends may have a higher weight in determining recommendations for a user than second media content viewed by users who are not friends.

As an example for illustrative purposes only, consider a scenario where a first user has liked the TV show "Garage Talk" in the past. Social networking system 160 may query social graph 200 in order to determine other users or friends of the first user who have also liked "Garage Talk." For example, social networking system 160 may determine that Friend A and User B also liked "Garage Talk." Social networking system 160 may then query social graph 200 for other media content liked by the other users or friends who also liked "Garage Talk." For example, social networking system 160 may determine that Friend A and User B, who liked "Garage Talk," also liked "Shop Journal" and "Cars Galore." Social networking system 160 may then display chat rooms for "Shop Journal" and "Cars Galore" in the chat interface. If, for example, Friend A liked "Shop Journal" and User B (who is not a friend of the first user) liked "Cars Galore," then a chat room for "Shop Journal" may appear higher in the list.

In some embodiments, social-networking system 160 may provide enhanced tagging of conversations that take place within the chat interface. For example, consider a scenario where a user selects message button 322e on NFL.com for a particular football game between the Patriots and the Colts. The user may then be presented with a chat interface that allows the user to have a conversation with other users of social-networking system 160 while watching the particular football game. Social-networking system 160 may detect the conversation and attempt to determine an appropriate tag (e.g., hashtag) to apply to the conversation. For example, if the conversation takes place during the same time period as a particular football game (e.g., the game between the Patriots and Colts), social-networking system 160 may correlate the times and deduce that the entire conversation was about the particular football game. Social-networking system 160 may then apply an appropriate tag (e.g., "#PatsvColts") to the conversation. As another example, social-networking system 160 may examine the conversation for key words in order to determine the appropriate tag for the conversation.

Figure 5:
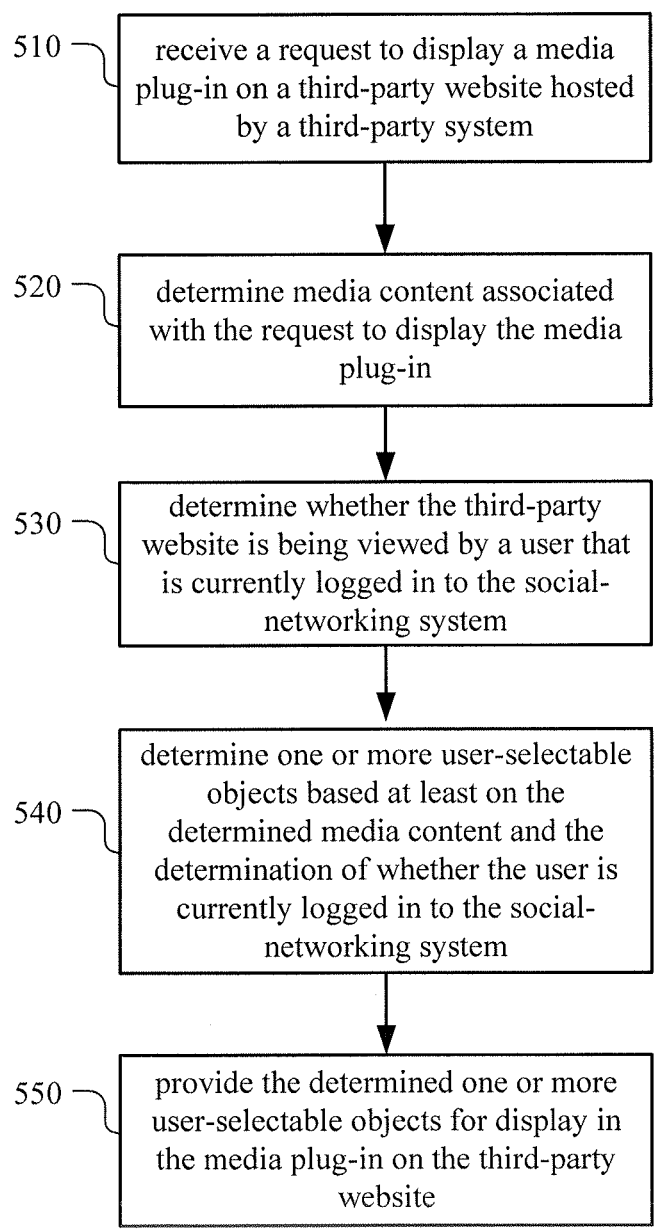
FIG. 5 illustrates an example method for providing a media plug-in to a third-party website, according to certain embodiments.

FIG. 5 illustrates an example method 500 for providing a media plug-in on a third-party website. The method may begin at step 510, where a request to display a media plug-in on a third-party website hosted by a third-party system is received. In some embodiments, the media plug-in is media plug-in 320 described above. In some embodiments, the third-party website is third-party website 310 described above. In some embodiments, the third-party system is third-party system 170 above. In some embodiments, the third-party system is separate from a social-networking system such as social-networking system 160. For example, the third-party system is not affiliated with, owned by, controlled by, or provided by the social-networking system. In some embodiments, the request is received by the social-networking system 160 from a web browser of the user, a web server of the third-party system, or any other appropriate system or software utilized to provide third-party website to the user.

In step 520, media content associated with the request to display the media plug-in is determined. In some embodiments, the media content is any TV show, movie, clip, video, trailer, etc. that is displayed on the third-party website in which the media-plugin of step 510 is to be displayed. For example, if the media-plugin of step 510 is to be displayed on a third-party website for a particular TV show, the media content of step 520 may be the particular TV show. In some embodiments, information within the request of step 520 is utilized to determine the media content. For example, an identification (e.g., an ID number, text, etc.) included within the request is utilized to determine the media content. In some embodiments, a page ID of the social-networking system is utilized to determine the media content.

In step 530, it is determined whether the third-party website is being viewed by a user that is currently logged in to the social-networking system. In some embodiments, information within the request of step 520 is utilized to determine whether the user is currently logged in to the social-networking system. For example, a user ID or IP address of the user may be utilized to determine whether the user is currently logged in to the social-networking system.

In step 540, one or more user-selectable objects are determined for displaying within the media plug-in of step 510. In some embodiments, the one or more user-selectable objects are determined based at least on the determined media content of step 520 and the determination of whether the user is currently logged in to the social-networking system of step 530. In some embodiments, the user-selectable objects cause an action related to the determined media content of step 520. In some embodiments, the actions may include creating a reminder to view media associated with the determined media content, creating an event on the social-networking system for media associated with the determined media content, presenting an interface to chat with other users of the social-networking system about the determined media content, launching a video player to view a video related to the determined media content, providing instructions to a DVR of the user to record media associated with the determined media content, providing instructions to tune another device (e.g., a STB or DVR) to a channel in which media associated with the determined media content may be viewed, and providing instructions to create an edge in a social graph of the social-networking system that is related to the determined media content. In some embodiments, the user-selectable objects include one or more of watch button 322a, record button 322b, remind button 322c, event button 322d, and message button 322e described above. In some embodiments, the one or more user-selectable objects, once selected by a user who is currently logged in to the social-networking system, are operable to generate one or more edges between the user and one or more other nodes in a social graph such as social graph 200. The social graph includes nodes and edges connecting the nodes, and the nodes include user nodes that are each associated with a particular user of the social-networking system.

In some embodiments, the determined one or more user-selectable objects of step 540 include a visual button that is operable to launch a video player to view a video related to the determined media content. In some embodiments, the video player is a video player of the social-networking system that is embedded in the third-party website. In some embodiments, the video player is a video player of a content provider that is hosted by the content provider. In some embodiments, the video player is a native video player that is associated with a particular OTT or MSO. In some embodiments, the video player is a video player of the web browser of the user.

In step 550, the determined one or more user-selectable objects of step 540 are provided for display in the media plug-in on the third-party website. For example, the social-networking system may return a URL to the third-party system that points to the determined user-selectable objects of step 540. After step 550, method 500 may end.

In some embodiments, method 500 may additionally include determining configuration information for the user. In some embodiments, the configuration information is determined if it is determined that the user is currently logged in to the social-networking system. In some embodiments, the configuration information is provided by the user and stored by the social-networking system. In some embodiments, the one or more user-selectable objects determined in step 540 are further based on the determined configuration information for the user. In some embodiments, the configuration information includes one or more of an indication of a MSO subscription package for the user, an indication of a MSO of the user, login information for a set-top box of the user, login information for a DVR of the user, subscription information for the user to a provider of on-demand Internet streaming media, and an indication of a location of the user.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
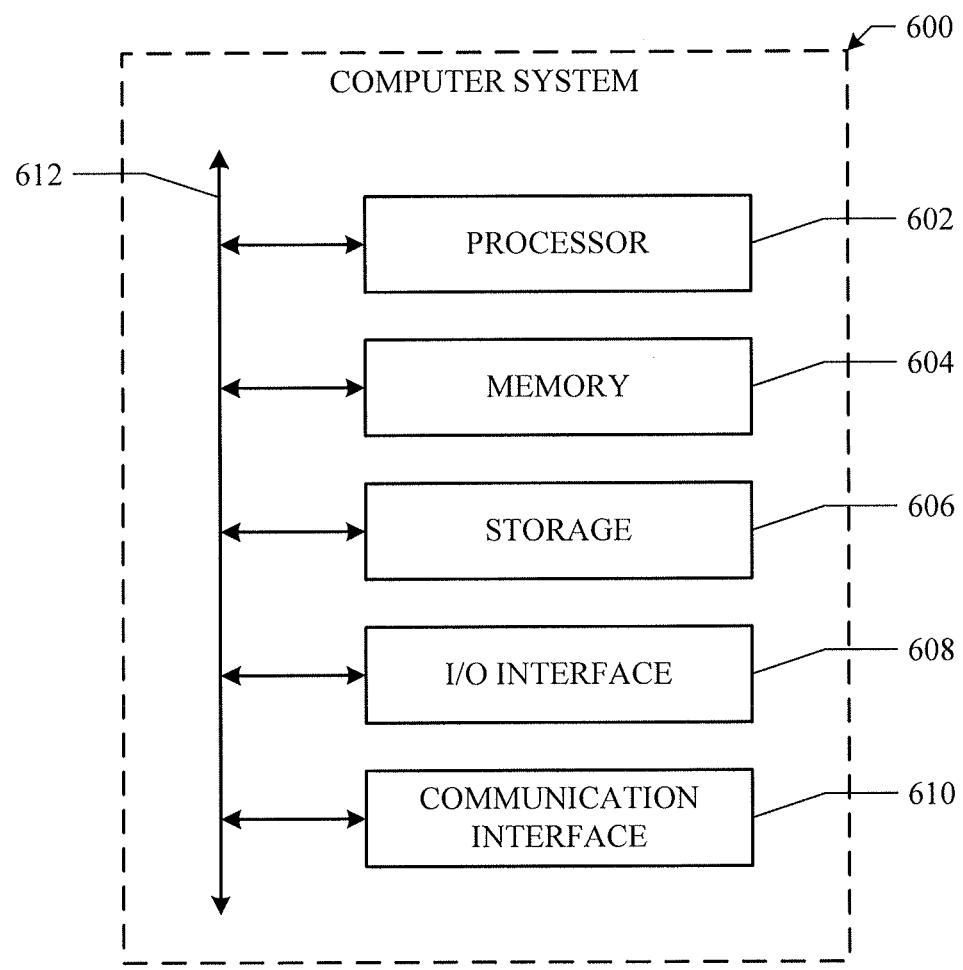
FIG. 6 illustrates an example computer system, according to certain embodiments.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "show" is inclusive of any appropriate media content. For example, "show" may refer to a TV show, a movie, a video game, or any other media content. "Show' is utilized herein for simplicity and is not intended to refer to only TV shows.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a first computing system, providing a media plug-in for display on a website hosted by a second computing system that is separate from the first computing system, the website being associated with particular media content;
by the first computing system, receiving a content identifier from the website, the content identifier associated with the particular media content of the website;
by the first computing system, determining a user who is viewing the website and is logged in to the first computing system;
by the first computing system, providing for display in the media plug-in one or more visual indications of one or more friends of the user who have previously indicated that they liked the particular media content associated with the website;
by the first computing system, determining whether the user has provided configuration information about a content provider of the user, the configuration information comprising login information for a set-top box (STB) of the user or login information for a digital video recorder (DVR) of the user; and
by the first computing system, providing one or more user-selectable objects for display in the media plug-in on the website, wherein:
the one or more user-selectable objects are determined using the content identifier, the determination of whether the user has provided configuration information about the content provider of the user, and a social graph;
the one or more user-selectable objects comprise a first user-selectable object that is operable, when selected, to view or record the media content associated with the website using a digital video recorder (DVR) or set-top box (STB) of the user; and
the one or more user-selectable objects dynamically change based on the determination using the content identifier and the social graph.

2. The method of claim 1, wherein the one or more user-selectable objects further comprise a visual button operable to launch a video player to view a video related to the particular media content of the website, the video player comprising one of:
a video player of a content provider of the particular media content;
a native video player installed on a computing system of the user; or
a video player of a web browser of the user.

3. The method of claim 1, wherein the particular media content is a particular TV show or a movie.

4. The method of claim 1, wherein at least one of the one or more user-selectable objects, once selected by the user, are operable to generate one or more edges between the user and one or more other nodes in the social graph, the social graph comprising a plurality of nodes and edges connecting the nodes, the nodes comprising user nodes that are each associated with a particular user of the social-networking system.

5. The method of claim 1, wherein the one or more user-selectable objects further comprise a message button operable to launch a chat interface, the chat interface comprising one or more selectable chat rooms, the chat rooms being ordered according to one or more of:
one or more social coefficients associated with the user;
a taste algorithm associated with the user;
a number of participants of each chat room; and
available media content for the user.

6. The method of claim 1, wherein the one or more user-selectable objects further comprise a watch operable to cause an event to be created within the first computing system, the event comprising a social event planned by the user.

7. The method of claim 1, wherein the configuration information comprises an identification of an over-the-top (OTT) content provider or an identification of a multiple system operator (MSO) of the user.

8. One or more computer-readable non-transitory storage media in one or more first computing systems, the media embodying logic that is operable when executed to:
provide a media plug-in for display on a website hosted by a second computing system that is separate from the one or more first computing systems, the website being associated with particular media content;
receive a content identifier from the website, the content identifier associated with the particular media content of the website;
determine a user who is viewing the website and is logged in to the one or more first computing systems;
provide for display in the media plug-in one or more visual indications of one or more friends of the user who have previously indicated that they liked the particular media content associated with the website;
determine whether the user has provided configuration information about a content provider of the user, the configuration information comprising login information for a set-top box (STB) of the user or login information for a digital video recorder (DVR) of the user; and
provide one or more user-selectable objects for display in the media plug-in on the website, wherein:
the one or more user-selectable objects are determined using the content identifier, the determination of whether the user has provided configuration information about the content provider of the user, and a social graph;
the one or more user-selectable objects comprise a first user-selectable object that is operable, when selected, to view or record the media content associated with the website using a digital video recorder (DVR) or set-top box (STB) of the user; and
the one or more user-selectable objects dynamically change based on the determination using the content identifier and the social graph.

9. The media of claim 8, wherein the one or more user-selectable objects further comprise a visual button operable to launch a video player to view a video related to the particular media content of the website, the video player comprising one of:
a video player of a content provider of the particular media content;
a native video player installed on a computing system of the user; or
a video player of a web browser of the user.

10. The media of claim 8, wherein at least one of the one or more user-selectable objects, once selected by the user, are operable to generate one or more edges between the user and one or more other nodes in the social graph, the social graph comprising a plurality of nodes and edges connecting the nodes, the nodes comprising user nodes that are each associated with a particular user of the social-networking system.

11. The media of claim 8, wherein the one or more user-selectable objects further comprise a message button operable to launch a chat interface, the chat interface comprising one or more selectable chat rooms, the chat rooms being ordered according to one or more of:
one or more social coefficients associated with the user;
a taste algorithm associated with the user;
a number of participants of each chat room; and
available media content for the user.

12. The media of claim 8, wherein the one or more user-selectable objects further comprise a watch operable to cause an event to be created within the first computing system, the event comprising a social event planned by the user.

13. A system comprising:
one or more processors of a first computing system; and
a memory coupled to the one or more processors comprising instructions executable by the processors, the one or more processors being operable when executing the instructions to:
provide a media plug-in for display on a website hosted by a second computing system that is separate from the first computing system, the website being associated with particular media content;
receive a content identifier from the website, the content identifier associated with the particular media content of the website;
determine a user who is viewing the website and is logged in to the first computing system;
provide for display in the media plug-in one or more visual indications of one or more friends of the user who have previously indicated that they liked the particular media content associated with the website;
determine whether the user has provided configuration information about a content provider of the user, the configuration information comprising login information for a set-top box (STB) of the user or login information for a digital video recorder (DVR) of the user; and
provide one or more user-selectable objects for display in the media plug-in on the website, wherein:
the one or more user-selectable objects are determined using the content identifier, the determination of whether the user has provided configuration information about the content provider of the user, and a social graph;
the one or more user-selectable objects comprise a first user-selectable object that is operable, when selected, to view or record the media content associated with the website using a digital video recorder (DVR) or set-top box (STB) of the user; and
the one or more user-selectable objects dynamically change based on the determination using the content identifier and the social graph.

14. The system of claim 13, wherein the one or more user-selectable objects further comprise a visual button operable to launch a video player to view a video related to the particular media content of the website, the video player comprising one of:
a video player of a content provider of the particular media content;
a native video player installed on a computing system of the user; or
a video player of a web browser of the user.

15. The system of claim 13, wherein the one or more user-selectable objects further comprise a message button operable to launch a chat interface, the chat interface comprising one or more selectable chat rooms, the chat rooms being ordered according to one or more of:
one or more social coefficients associated with the user;
a taste algorithm associated with the user;

a number of participants of each chat room; and
available media content for the user.

16. The system of claim 13, wherein the one or more user-selectable objects further comprise a watch operable to cause an event to be created within the first computing system, the event comprising a social event planned by the user.

\* \* \* \* \*